Patented Dec. 18, 1945

UNITED STATES PATENT OFFICE 2,391,233

POLYMERIZATION OF BUTADIENE-1,3 HYDROCARBONS

Elbert E. Gruber, Cuyahoga Falls, Ohio, assignor to The B. F. Goodrich Company, New York, N. Y., a corporation of New York No Drawing. Application December 7, 1944, Serial No. 567,117

8 Claims. (Cl. 260—86.5)

This invention relates to the polymerization in aqueous emulsion of butadiene-1,3 hydrocarbons or mixtures thereof with other unsaturated compounds copolymerizable therewith in aqueous emulsion to produce polymeric materials, and particularly to a method of conducting such polymerizations whereby rubbery polymers and copolymers, or synthetic rubber, of excellent quality may be produced in a very short time.

In the production of synthetic rubber by the polymerization in aqueous emulsion of butadiene-1,3 hydrocarbons or mixtures thereof with other unsaturated compounds, called comonomers, such as styrene and acrylonitrile, it is ordinarily desirable to carry out the polymerization in the presence of an organic compound, called a polymerization modifier, which modifies or regulates the polymerization in such a manner that plastic, soluble, rubbery products resembling unvulcanized natural rubber rather than tough, difficultly worked rubbery materials resembling vulcanized natural rubber are obtained. It has been found, however, that polymerizations effected in the presence of many of the most effective modifiers often do not proceed as rapidly as is desired, and that this is particularly the case when modifiers which are organic polysulfides are used.

I have now discovered that the polymerization of butadiene-1,3 hydrocarbons effected in aqueous emulsion in the presence of organic polysulfide modifiers is greatly accelerated by also including in the emulsion during the polymerization a ketol in which a hydrogen atom and the hydroxyl group are attached to a carbon atom adjacent to the keto group. By this method of procedure, it has been found possible not only to produce well-modified high-quality synthetic rubber, but also to carry out the polymerization at the desired rapid rate. Moreover, this result is quite surprising inasmuch as the polymerization rate, using the combination of organic polysulfide and ketol is not only much faster than when using the polysulfide alone, but also is much faster than when using the ketol alone.

Although any ketol in which a hydrogen atom and the hydroxyl group are attached to a carbon atom adjacent to the keto group may be employed in this invention, it is preferable that the ketol used be an acyloin such as benzoin, cuminoin, anisoin, acetoin, propion, butyroin, isovaleroin, pivaloin, capronoin, adipoin, and the like. Other ketols containing the structure:

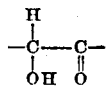

which are not classified as acyloins, such as acetol, ethyl ketol, methyl ethyl ketol, pentanol-2-one-3, 2-methylbutanol-4-one-3, 2-methylpentanol-5-one-4, 2,5-dimethylhexanol-4-one-3, phenacyl alcohol, p-isopropylphenacyl alcohol, benzyl acetyl carbinol, and the like may also be used.

As mentioned hereinabove, the use of these ketols in the emulsion polymerization of butadiene-1,3 hydrocarbons offers greatest advantages when they are employed together with a polymerization modifier which is an organic polysulfide, such as a disulfide, trisulfide or tetrasulfide. Many organic polysulfide polymerization modifiers are known to the art and include compounds of the general formula, X—(S)$_n$—X, wherein $n$ is an integer from 2 to 4, and X is a monovalent organic radical, preferably having its monovalency on a carbon atom, which may be either aliphatic, aromatic, alicyclic or heterocylic in character. Polysulfides of the above structure in which X is an organic radical in which the terminal carbon atom (the carbon atom bearing the monovalency) is a plurally bound carbon atom, that is a carbon atom connected by a plural bond to another atom, such as a carbon atom, oxygen atom, sulfur atom, or nitrogen atom, are especially effective polymerization modifiers, and are preferably used. Examples of such preferred polysulfide modifiers include those of the above structure in which X is an aromatic or aliphatic acyl or thioacyl radical, a carbamyl or thiocarbamyl radical, a xanthogenyl or thioxanthogenyl radical, a thiazyl or substituted thiazyl radical, or an aryl or substituted aryl radical. Other polysulfide modifiers include those of the above structure in which X is an alkyl, aminoalkyl, nitroalkyl, alkenyl, aralkyl, chloroalkyl, furyl, tetrahydrofuryl, pyridyl, quinolyl, pyranyl, indolyl, or other monovalent organic radical.

Of all these polysulfide modifiers, the dixanthogens, that is, compounds which possess the formula,

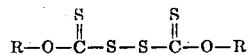

wherein R is a monovalent inactive organic radical, such as a hydrocarbon radical or an ether substituted hydrocarbon radical, are particularly effective polymerization modifiers, and their use together with a ketol, is particularly preferred. Specific examples of dixanthogens include the bis-(alkyl xanthogens), such as bis-(ethyl xanthogen), bis-(isopropyl xanthogen), bis-(n-butyl xanthogen), bis-(sec-butyl xanthogen), bis-(2-ethylhexyl xanthogen), bis-(dodecyl xanthogen) and the like, as well as other dixanthogens, such as bis-(cyclohexyl xanthogen), bis-tetrahydrofurfuryl xanthogen) bis-(benzyl xanthogen), cyclohexyl isopropyl dixanthogen, and the like. The thiodixanthogens corresponding to the above formula except that oxygen is replaced by sulfur, and xanthogen compounds containing three or four sulfur atoms between the thiono groups are also polymerization modifiers, and may be used in place of the dixanthogen.

Specific examples of other polysulfide modifiers in addition to the dixanthogens, include those in the following list:

Di-ethyl disulfide
Di-n butyl disulfide
Di-isoheptyl disulfide
Di-2-ethyl hexyl disulfide
Di-o-tolyl disulfide
Di-p-tolyl disulfide
Di-benzyl disulfide
Di-o-tolyl trisulfide
Di-dodecyl tetrasulfide
Di-o-nitrophenyl disulfide
Di-chlorooctyl disulfide
Di-benzoyl disulfide
Bis-(benzothiazyl-2) disulfide
Bis-(4-methylbenzothiazyl-2) disulfide
Bis-(4-phenyl thiazyl-2) disulfide
Benzothiazyl-2 o-nitrophenyl disulfide
Tetramethyl thiuram disulfide
Di-pentamethylene thiuram disulfide
Di-furoyl disulfide
Di-4-morpholinyl disulfide
Di-cyclohexyl disulfide Although the acceleration of butadiene-1,3 hydrocarbon polymerizations brought about by the use of the ketols hereinabove described, is of greatest magnitude when the ketol is used to accelerate a polymerization modified by an organic polysulfide, it is also possible to accelerate such polymerizations effected in the presence of other modifiers, or even in the absence of any modifiers, by employing such a ketol. For example, polymerizations modified with organic mercaptans, certain organic monosulfides, xanthates, thiazoles, and other polymerization modifiers which are not organic polysulfides, but which are sulfur-containing organic compounds having a divalent sulfur atom not a part of a ring structure connected to two other atoms, one of which is carbon, may also be accelerated by employing a ketol. Furthermore, butadiene-1,3 hydrocarbon polymerizations carried out in the absence of a modifier are accelerated by the presence of a ketol, but in this instance the products are relatively tough, non-plastic rubbery materials rather than plastic, well-modified rubbery materials.

The use of ketols to accelerate polymerization, according to this invention, is applicable to the polymerization of any butadiene-1,3 hydrocarbon, such as butadiene-1,3, isoprene, 2,3-dimethyl butadiene-1,3, piperylene, and the like, either alone or in admixture in any desired proportion and with any desired number of other unsaturated polymerizable compounds, copolymerizable therewith. Many unsaturated organic compounds are known to be copolymerizable in aqueous emulsion with butadiene-1,3 hydrocarbons, and any of such compounds may be used, it being understood that the precise nature of the copolymerizable compound is in no way critical in this invention. Typical examples of such copolymerizable compounds include, in addition to other butadiene-1,3 hydrocarbons, other conjugated dienes such as chloroprene, 3 - (p-chlorophenyl) -butadiene-1,3, cyclopentadiene, myrcene, and the like, and copolymerizable compounds containing a single olefinic double bond, such as styrene, vinyl naphthalene, p-chloro styrene, 3,5-dichloro styrene, p-methoxy styrene, alpha-methyl styrene, acrylonitrile, methacrylonitrile, alpha-chloro acrylonitrile, methyl acrylate, methyl methacrylate, butyl ethacrylate, methyl alpha-chloro acrylate, methacrylamide, vinyl methyl ketone, methyl vinyl ether, diethyl fumarate, vinyl ethinyl diethyl carbinol, vinyl pyridene, vinylidene chloride, vinyl acetylene, isobutylene, ethylene, and other similar monoolefinic polymerizable compounds. When mixtures of butadiene-1,3 hydrocarbons with such copolymerizable compounds are employed, it is preferable that the copolymerizable compound be one which contains a $CH_2=C<$ group, preferably attached by at least one of the disconnected valences to a plurally bound carbon atom, such as is present in an aryl group, a cyano group or a carbonyl group; and that the butadiene-1,3 hydrocarbon be present in a predominant amount, that is to the extent of at least 50% by weight of the mixture.

In the practice of the invention, the monomeric materials to be polymerized are first emulsified with an aqueous solution comprising a suitable emulsifying agent. Emulsifying agents which may be employed for this purpose include soaps of fatty acids such as sodium myristate, sodium oleate, potassium palmitate, ammonium stearate and the like and soaps of rosin acids such as sodium dehydroabietate, as well as other saponaceous materials including alkali metal alkyl sulfates, alkali metal alkaryl sulfonates, and salts of high molecular weight bases such as lauryl amine hydrochloride.

The monomeric materials while so emulsified are then polymerized by agitating the emulsion at a temperature of about 20 to 100° C., for a period of time necessary to convert from 75 to 100% of the monomeric material into polymer, this being effected generally in about 5 to 25 hours, the polymerization being terminated if desired at the desired conversion of monomers into polymer by adding to the emulsion a polymerization inhibitor such as hydroquinone or phenyl-beta-naphthylamine. The products are obtained in the form of an aqueous dispersion resembling natural rubber latex, which may be used as such or coagulated to yield the massive synthetic rubber.

As is made apparent hereinabove, the novel feature of the polymerization of this invention consists of the fact that a ketol of the type described is present in the emulsion during the polymerization, preferably together with an organic polysulfide as a modifier. While it is preferred that these materials be added to the emulsion prior to the beginning of the polymerization, it is also within the scope of the invention to add a part or all of either or both of these to the emulsion in stages or continuously during the time that the polymerization is taking place.

The amount of the ketol to be employed is not critical, and may be varied over a considerable range. In general, however, it is desirable to employ about 0.05 to 1% by weight based on the weight of the material polymerized, the use of 0.1 to 0.5% being especially preferred. The amount of the polysulfide modifier may also be varied considerably, depending upon the degree of modification desired in the finished polymer. In general, amounts of about 0.1 to 3% by weight based on the weight of the material polymerized are used.

It is also desirable to employ a polymerization initiator in the emulsion during the polymerization. The preferred initiators are potassium persulfate and hydrogen peroxide, although other peroxygen compounds including benzoyl peroxide, diacyl peroxides, sodium perborate, potassium percarbonate, and other water-soluble persalts may also be employed. Polymerization catalysts which are heavy metal salts, such as the simple and complex water-soluble salts of iron, cobalt and nickel, for example sodium ferripyrophosphate, cobaltous chloride, sodium ferricyanide, and the like, may also be present in the emulsion during the polymerization, the presence of such a heavy metal catalyst being especially desirable when the polymerization is carried out in such a manner that free oxygen is not vigorously excluded from the polymerization.

The presence of water-soluble salts, particularly those having polyvalent anions such as sodium phosphate, sodium pyrophosphate and the like is also desirable during the polymerization since they enable the emulsion to remain fluid and prevent undesirable gelation of the latex during the polymerization.

To illustrate the practice of the invention and the desirable results to be obtained thereby, reference is now had to specific examples of the polymerization of a mixture of butadiene-1,3 and styrene in aqueous emulsion in the presence of benzoin, a preferred ketol of the class described, and bis-(isopropyl xanthogen) a preferred organic polysulfide modifier of the class described. In the examples and in the control polymerizations, the data of which are set forth in Table I, mixtures of 75 parts by weight of butadiene-1,3 and 25 parts by weight of styrene are emulsified with 180 parts of an aqueous solution containing five parts of fatty acid soap, 0.3 part of potassium persulfate, and the stated quantities of benzoin, bis-(isopropyl xanthogen) and other materials as shown in the table, and polymerization of the emulsified material is then effected by agitating the emulsion at 50° C. for the periods of time stated, polymerization being terminated at the time stated by the addition to the emulsion of a small quantity of phenyl beta-naphthylamine. The yield of polymer obtained, and the overall rate of polymerization expressed in per cent yield per hour for the various polymerizations are set forth in the table.

examples not using the xanthogen are considerably less plastic and more difficultly worked.

It is to be noted from the table that the rate of polymerization using both benzoin and bis-(isopropyl xanthogen) is much greater than when using either of these alone. It is also to be noted that the rate of polymerization is increased when using benzoin even though no xanthogen is present.

Accordingly, it is seen that plastic, synthetic rubbers of excellent properties are obtained at a rapid polymerization rate when both benzoin and a dixanthogen are employed in the emulsion during the polymerization. When using benzoin alone, the polymers are also obtained at an improved rate, but do not possess the desired high plasticity and excellent physical properties. On the other hand, when using the dixanthogen alone, the polymers possess good plasticity and excellent physical properties, but the rate of polymerization is relatively slow. The advantages of employing both benzoin and a dixanthogen are therefore apparent.

Similar examples, in which other ketols specifically mentioned hereinabove, and of the class herein set forth, are substituted for the benzoin in the examples of the table, show that the polymerization is carried out more rapidly whenever such a ketol is present. Moreover, examples in which the bis-(isopropyl xanthogen) is substituted by other dixanthogens, as well as by other polysulfides of the type hereinabove set forth, also show that the same advantages are obtained whenever the combination of a ketol with a dixanthogen or other organic polysulfide is employed. Furthermore, these advantages are not confined to the polymerization of butadiene-1,3 and styrene under the specific conditions used in the examples set forth in the table, but are also obtained with any polymerization of a butadiene-1,3 hydrocarbon, either alone or in admixture with other monomers as hereinabove set forth, and when employing other emulsifying agents, other polymerization initiators, or other polymerization conditions, all as is set forth here- Table I

| | Benzoin, parts by weight | Bis-(isopropyl xanthogen), parts by weight | Other substances | Time | Yield | Polymerization rate, percent yield/hr. |
|---|---|---|---|---|---|---|
| | | | | Hours | Per cent | |
| Example 1 | 0.02 | 0.40 | NaFeCo pyrophosphate [1] catalyst+air | 16.2 | 77.0 | 4.69 |
| Example 2 | 0.05 | 0.40 | Ibid | 16.2 | 80.0 | 4.94 |
| Example 3 | 0.05 | 0.50 | Ibid | 18.0 | 81.1 | 4.50 |
| Example 4 | 0.07 | 0.67 | Ibid | 17.3 | 80.0 | 4.56 |
| Example 5 | 0.05 | None | Ibid | 18.0 | 78.5 | 4.34 |
| Example 6 | 0.07 | None | Ibid | 17.0 | 69.0 | 4.06 |
| Control 1 | None | 0.40 | Ibid | 16.2 | 56.0 | 3.46 |
| Control 2 | None | 0.67 | Ibid | 26.0 | 84.0 | 3.21 |
| Control 3 | None | None | Ibid | 18.0 | 64.0 | 3.56 |
| Example 7 | 0.05 | 0.50 | Na pyrophosphate (0.5 part) absence of air | 18.0 | 78.3 | 4.35 |
| Example 8 | 0.10 | 0.50 | Ibid | 18.0 | 80.7 | 4.48 |
| Example 9 | 0.50 | 0.50 | Ibid | 18.0 | 77.6 | 4.31 |
| Example 10 | 0.50 | None | Ibid | 18.0 | 76.7 | 4.26 |
| Control 4 | None | 0.50 | Ibid | 18.0 | 57.0 | 3.17 |
| Example 11 | 0.05 | 0.40 | Ibid | 17.6 | 79.8 | 4.54 |
| Example 12 | 0.10 | 0.67 | Ibid | 18.2 | 78.6 | 4.32 |
| Example 13 | 0.05 | None | Ibid | 17.8 | 78.4 | 4.40 |
| Example 14 | 0.10 | None | Ibid | 17.2 | 79.0 | 4.01 |
| Control 5 | None | 0.40 | Ibid | 21.0 | 78.8 | 3.74 |
| Control 6 | None | 0.67 | Ibid | 21.3 | 78.2 | 3.67 |

[1] A catalyst prepared by dissolving in water 0.5 part of sodium pyrophosphate decahydrate, 0.035 part of ferric sulfate and 0.006 part of cobaltous chloride decahydrate.

The products obtained in the polymerization set forth in the table are plastic, soluble easily-worked synthetic rubbers of high tensile strength and elasticity in each instance where bis-(isopropyl xanthogen) is used. The products in the inabove. Accordingly, it is not intended that the invention be limited to the specific details of the specific examples, but rather that it be limited only by the spirit and scope of the appended claims.

I claim:

1. The method which comprises polymerizing a butadiene-1,3 hydrocarbon in aqueous emulsion in the presence of a ketol in which a hydrogen atom and the hydroxyl group are attached to a carbon atom adjacent to the keto group, and also in the presence of an organic polysulfide.

2. The method which comprises polymerizing in aqueous emulsion a mixture of a butadiene-1,3 hydrocarbon and an unsaturated organic compound copolymerizable therewith in aqueous emulsion, in the presence of an acyloin and an organic polysulfide.

3. The method which comprises polymerizing in aqueous emulsion a mixture of a butadiene-1,3 hydrocarbon and an unsaturated organic compound copolymerizable therewith in aqueous emulsion, in the presence of an acyloin and a dixanthogen.

4. The method which comprises polymerizing in aqueous emulsion a mixture of a butadiene-1,3 hydrocarbon and styrene in the presence of an acyloin and an organic polysulfide.

5. The method which comprises polymerizing in aqueous emulsion a mixture of a butadiene-1,3 hydrocarbon and an unsaturated organic compound copolymerizable therewith in aqueous emulsion, in the presence of benzoin and an organic polysulfide.

6. The method which comprises polymerizing in aqueous emulsion a mixture of a butadiene-1,3 hydrocarbon and an unsaturated organic compound copolymerizable therewith in aqueous emulsion, in the presence of benzoin and a dixanthogen.

7. The method which comprises polymerizing in aqueous emulsion a mixture of butadiene-1,3 and styrene in the presence of benzoin and a dixanthogen.

8. The method which comprises polymerizing in aqueous emulsion a mixture of butadiene-1,3 and styrene in the presence of benzoin and bis-(isopropyl xanthogen).

ELBERT E. GRUBER.